UNITED STATES PATENT OFFICE 2,438,100

BLEACHING CELLULOSE TEXTILE FIBERS

Thomas C. Whitner, Elizabeth, N. J., assignor to Chemical Laboratories, Inc., a corporation of New Jersey No Drawing. Application March 17, 1944, Serial No. 527,005

8 Claims. (Cl. 8—111)

This invention relates to improvements in the treating of cellulosic or vegetable fibers which are applicable for the production of textile materials. This invention also includes improvements in the bleaching of cellulosic textile fibers.

I have observed when cellulosic or vegetable fibers are impregnated with an aqueous solution of an alkylolamine and then treated with ozone or ozonized air that a considerable decolorizing or bleaching of the fibers occurs. This decolorizing or bleaching effect is accompanied in many instances by an increase in the adsorptive properties of the fibers as indicated by a greater affinity for dyes. The last-named property may be exhibited not only by a greater adsorption of the dyes from solution by the treated fibers but also by a greater retention of the dye by the fibers when the latter are subjected to such tests as washing with hot water.

Examples of the alkylolamines which are suitable for my purpose are monoethanolamine, diethanolamine and triethanolamine. Such compounds can be made by the interaction of ethylene oxide and ammonia. Other examples of alkylolamines which may be employed are 2-amino-2-methyl-1-propanol and 2-amino-2-methyl-1,3-propanediol. The former compound can be made by interaction of formaldehyde and 2-nitropropane to yield a nitroalcohol which then is reduced to the amino compound. The last-named alkylolamine can be synthetized by reaction formaldehyde (2 mols) with nitroethane (1 mol) to give a nitroglycol which in turn is reduced to the amino compound. Other aliphatic aldehydes and nitroparaffins can serve as suitable initial materials for the preparation of alkylolamines applicable for my purposes. However, I do not wish to be limited to hydroxyamines obtained by the above-mentioned methods as those alkylolamines (mono- or poly-hydroxy) which are appreciably soluble in water may be employed. Furthermore, as just indicated, the alklyolamines may be primary, secondary or tertiary amines.

Ozonized air may be produced by any of the well-known methods, as for example, by the action of a spark discharge or of ultraviolet light on air. The concentration of ozone may vary between rather wide limits, a range of working concentrations being from about 900 mg. to about 10 g. cubic meter of air. However, I do not wish to be limited to this range of concentration, since ozonized air containing a smaller or a greater proportion of ozone may be used. The concentration of ozone will determine largely the rapidity of the reaction and therefore the degree to which the resulting effects, e. g., decoloration or bleaching of the textile fibers, will be obtained.

Before treating the fibers according to this invention, particularly if they are in the form of yarn or woven fabrics, they are cleaned or scoured in any desired manner to free them of dirt, grease, sizing or other extraneous materials. Next, they are immersed or soaked for a sufficient period of time (say a few minutes) in an aqueous solution of the alkylolamine to effect their saturation with the liquid. Then the fibers are removed from the solution and subjected to some suitable operation, e. g., pressing or hydro-extracting, which will remove any excess or non-adsorbed liquid. Afterwards, the damp fibers are treated with ozone, for example, by placing them in a container through which is passed a current of ozonized air. When the fibers have been treated with ozone for a sufficient period of time to secure the desired effects, they are removed from the container and subjected to a washing operation to eliminate the adsorbed solution of alkylolamine. This last step (i .e., washing) may be done with water only or, if desirable or necessary, with a dilute aqueous solution of an acid (e. g., sulfuric or hydrochloric) and then with water. After they are washed, the fibers may be dried or subjected while damp to some other type of treatment or finishing operation, as for example, dyeing.

The following examples will illustrate my invention. It should be understood that in every instance the textile material had been subjected to a cleaning or scouring operation prior to the treatment described.

*Example 1.*—The textile material in this instance was cotton cloth which had been given a very mild treatment with dilute aqueous hypochlorite and therefore was partially bleached. A portion of this material was immersed in a 5 per cent aqueous solution of triethanolamine for a few minutes, then removed and pressed to remove adhering liquid. The cloth impregnated with the amine solution was placed in a container through which was passed a stream of ozonized air containing 1.3 mg. of ozone per liter of air. After treatment with ozonized air for 30 minutes, the cloth was taken out of the container and washed with water to remove the alkali (amine). It was noted that this treated cloth was lighter in color than the untreated (original) cloth.

A sample of the ozone-treated and one of the untreated cotton cloth were dyed in separate baths, using in each instance 100 parts of water per 1 part of cloth and a quantity of red substantive dye (dissolved in the water) equal to 5 per cent the weight of the cloth. The bath in each case was kept at a temperature of 80° to 90° C. for 30 minutes and then allowed to cool for 30 minutes. The samples of cotton cloths then were removed from the respective baths, washed well with cold water and air-dried. The ozone-treated sample was much darker in color.

*Example 2.*—Unbleached cotton cloth was impregnated with a 20 per cent aqueous solution of monoethanolamine in the manner indicated in Example 1 for triethanolamine. The impregnated cloth was treated with ozonized air, as described in Example 1, for 40 minutes and afterwards washed well with water to remove the alkali.

The ozone-treated sample and one of the unbleached, untreated cloth were dyed in separate baths according to the procedure of Example 1 with the exceptions that a green substantive dye was employed and the quantity of dye was equal to 10 per cent of the weight of cloth. After dyeing the ozone-treated sample was much darker in color. When the two dyed samples were subjected separately to a washing test with hot water it was noted that the ozone-treated and dyed sample retained much more of its color than did the other sample.

*Example 3.*—Bleached linen cloth was impregnated with an aqueous solution prepared by dissolving (in the proportions of) 2 parts of 2-amino-2-methyl-1,3-propanediol in 12 parts of water. The impregnated cloth was treated for 1 hour, as described in Example 1, with a stream of ozonized air containing 1.3 mg. of ozone per liter of gas. Afterwards the cloth was washed with water to free it of the amine and dried.

A portion of the treated cloth and also one of the untreated (original) cloth were dyed, using the method described in Example 1 with the exceptions that 4 per cent (based on the weight of cloth) of a blue substantive dye was employed. After completion of the dyeing operation the ozone-treated sample was considerably darker in color than the other sample.

*Example 4.*—Unbleached linen cloth was saturated with a 7 per cent aqueous solution of 2-amino-2-methyl-1-propanol and, after pressing to eliminate excess liquid, was treated with ozonized air in the manner indicated in Example 1. In this instance the concentration of ozone was 1000 mg. per cubic meter of air. After the cloth had been treated for an hour it was washed with water to remove the alkali (amine), again impregnated with the aqueous solution of 2-amino-2-methyl-1-propanol and treated with ozonized air for an hour. Next, the linen sample was washed with water to remove the amine and then washed with boiling 1 per cent aqueous sodium carbonate for 15 minutes. Finally, the treated sample was washed with water to eliminate the sodium carbonate. The foregoing procedure resulted in quite appreciable decolorizing or bleaching of the cloth.

*Example 5.*—Unbleached linen cloth was impregnated with a 15 per cent aqueous solution of monoethanolamine, pressed to eliminate non-adsorbed liquid and then placed in a container through which was conducted a current of ozonized air containing 1500 mg. of ozone per cubic meter. After 1 hour the cloth was taken from the container, washed well with water to free it of alkali (amine), then saturated with the aqueous solution of monoethanolamine, and again treated with ozonized air for 1 hour. At the end of this period of time, the linen sample was removed from the container, washed well with water, and air-dried. It was observed that the ozone-treated sample had been decolorized and was much lighter in color than the original unbleached cloth.

The ozone-treated sample of linen cloth and also one of the unbleached (original) cloth were treated separately by immersing each in an aqueous solution of sodium hypochlorite, using 10 parts of hypochlorite solution for 1 part of linen cloth. The hypochlorite solution contained 0.25 g. of available chlorine per liter. After remaining immersed at room temperature for 1 hour, each sample was removed from the liquid, squeezed and then covered with a dilute aqueous solution of sulfuric acid, using 10 parts of the aqueous acid to 1 part of textile material. After the samples had been soured for 1 hour at room temperature, they were washed successively with water, dilute aqueous sodium thiosulfate and water. Afterwards they were air-dried. The sample which had been treated previously with ozone was much lighter in color although neither sample was fully bleached.

The difference in color was even more marked when each of the above samples was treated for 30 minutes with boiling aqueous 1 per cent sodium carbonate and afterwards washed well with water and dried.

It will be seen that my invention involves impregnating or saturating cellulosic fibers with an aqueous solution of an alkylolamine, treating the fibers while impregnated with the aqueous solution with ozone or ozonized air, and then removing the alkylolamine from the treated fibers. Treatment of the impregnated fibers with ozone or ozonized air may be effected in one operation or in two or more successive operations. In the latter case between each treatment with ozone, the fibers may be washed with water and then again impregnated with the aqueous solution of alkylolamine. Or, the washing with water can be omitted and fibers merely impregnated or saturated with the solution of alkylolamine.

The duration of treatment with ozone as well as the concentration of the latter are factors which are governed by the extent or degree of decoloration desired and may be determined easily and readily for the particular cellulosic fiber at hand. It should be noted also that the process according to this invention may be used as the only decolorizing or bleaching operation or it may be employed in combination with processes involving other bleaching agents such as alkali metal or alkaline-earth metal hypochlorites, alkali metal peroxides, hydrogen peroxide, alkali metal perborates, alkali metal chlorites and the like. Processes involving the use of these last-named bleaching agents may either precede or follow that claimed as my invention.

The concentrations of the solutions of alkylolamines employed for impregnating the cellulosic or vegetable fibers can be varied over wide limits which may be as small as a fraction of a per cent to as large as 20, 30 or 40 per cent, or even greater. I have observed in some instances that cellulosic fibers which have been impregnated with an aqueous solution of an alkylolamine and then treated with ozone or ozonized air will not only become decolorized or bleached but will exhibit also an appearance which in some respects resembles that of mercerized cellulosic fibers.

What I claim is:

1. The process which comprises impregnating undyed cellulose textile fibers at substantially atmospheric temperature with an aqueous solution of an alkylolamine, said alkylolamine being substantially the only solute in said solution and its concentration being great enough to maintain said fibers in an alkaline condition, separating non-absorbed aqueous solution from said fibers, treating said impregnated fibers at substantially atmospheric temperature with gaseous ozone, and removing substantially all the alkylolamine from the treated fibers.

2. The process which comprises impregnating undyed cellulose textile fibers at substantially atmospheric temperature with an aqueous solution of an alkylolamine, said alkylolamine being substantially the only solute in said solution and its concentration being great enough to maintain said fibers in an alkaline condition, separating non-absorbed aqueous solution from said fibers, treating said impregnated fibers at substantially atmospheric temperature with an atmosphere of ozonized air, and removing substantially all the alkylolamine from the treated fibers.

3. The process according to claim 2 in which the alkylolamine is a monoalkylolamine.

4. The process according to claim 2 in which the alkylolamine is a polyalkylolamine.

5. The process which comprises impregnating undyed cellulose textile fibers at substantially atmospheric temperature with an aqueous solution of an alkylolamine, said alkylolamine being substantially the only solute in said solution and its concentration being great enough to maintain said fibers in an alkaline condition, separating non-absorbed aqueous solution from said fibers, treating said impregnated fibers at substantially atmospheric temperature with ozonized air containing not less than about 900 mg. of ozone and not more than about 10 g. of ozone per cubic meter, and removing substantially all the alkylolamine from the treated fibers.

6. The process according to claim 5 in which the alkylolamine is monoethanolamine.

7. The process according to claim 5 in which the alkylolamine is diethanolamine.

8. The process according to claim 5 in which the alkylolamine is triethanolamine.

THOMAS C. WHITNER.

REFERENCES CITED

The following references are of record in the file of this patent:

UNITED STATES PATENTS

| Number | Name | Date |
|---|---|---|
| 1,760,042 | Crespi | May 27, 1930 |
| 1,934,956 | Wait | Nov. 14, 1933 |
| 2,096,400 | Kritchevsky | Oct. 19, 1937 |
| 2,189,918 | Moncrieff | Feb. 13, 1940 |

FOREIGN PATENTS

| Number | Country | Date |
|---|---|---|
| 2214 | Great Britain | 1868 |
| 470,612 | Great Britain | Aug. 18, 1937 |
| 483,512 | Germany | Oct. 1, 1929 |

OTHER REFERENCES

Matthews: "Bleaching and Related Processes," 1921, pages 513–514.